United States Patent [19]

Tonegawa

[11] Patent Number: 4,459,085
[45] Date of Patent: Jul. 10, 1984

[54] PRESSURE CONTROL SYSTEM FOR AUTOMOTIVE PNEUMATIC PRESSURE SUPPLY LINE

[75] Inventor: Hiroshi Tonegawa, Higashi Matsuyama, Japan

[73] Assignee: Diesel Kiki Company, Ltd., Tokyo, Japan

[21] Appl. No.: 395,441

[22] Filed: Jul. 6, 1982

[30] Foreign Application Priority Data

Jul. 17, 1981 [JP] Japan .................................. 56-112023

[51] Int. Cl.³ ............................................. F04B 49/08
[52] U.S. Cl. ..................................... 417/282; 417/298
[58] Field of Search ................. 417/18, 282, 298, 364; 123/357

[56] References Cited

U.S. PATENT DOCUMENTS 1,806,925  5/1931  Trapper ................................. 417/298
2,256,565  9/1941  Mantle .................................. 417/298
2,961,148 11/1960  Courtney ......................... 417/298 X
3,074,619  1/1963  Larsson ........................... 417/282 X
3,180,266  4/1965  Smith .................................. 417/282
3,933,137  1/1976  Uno ................................. 123/357 X Primary Examiner—Richard E. Gluck
Attorney, Agent, or Firm—David G. Alexander

[57] ABSTRACT

A unique system is disclosed which controls a pressure in a pneumatic pressure supply line of a vehicle in response to both a pressure developing in an accumulator (12) included in the supply line and an engine load, so that a compressor (10) for providing the pressure is activated under light load engine operation, as when air brakes are applied, to effect an engine brake and to elevate the accumulator pressure for reducing the total energy consumption and, therefore, total fuel consumption. A pressure feedback line (16) communicates a pressure in the accumulator (12) to an unloading pressure control valve (32) through a solenoid operated valve (34), which is controlled in response to an output of an engine load sensor (42) and that of a pressure sensor (44). Under heavy load engine operation, the valve (34) is opened at a first pressure level during an elevation of the pressure and closed at a second pressure level which is sufficiently lower than the first during a drop of the pressure. Under light load engine operation, the second pressure level is preselected to coincide with or substantially coincide with the first.

4 Claims, 3 Drawing Figures

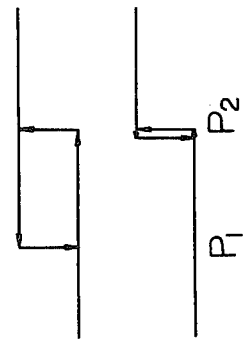
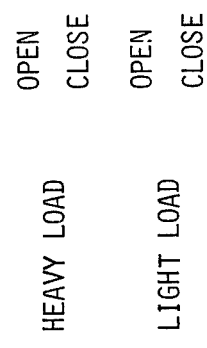
Fig. 2a  HEAVY LOAD
Fig. 2b  LIGHT LOAD

PRESSURE CONTROL SYSTEM FOR AUTOMOTIVE PNEUMATIC PRESSURE SUPPLY LINE

BACKGROUND OF THE INVENTION

The present invention relates to pneumatic pressure control systems and, more particularly, to a system for controlling a pressure in an accumulator which is included in an air piping of a vehicle and shared by various loads such as air brake units or air suspension units.

All the known pressure control systems of the type described respond only to the accumulator pressure in controlling the same. An unloading valve mounted on a compressor is communicated with the accumulator by a pressure feedback circuit in which a governor is disposed. As the pressure inside the accumulator rises beyond a predetermined level, the governor is opened to condition the compressor into a relief or decompression state through the unloading valve. Upon drop of the accumulator pressure beyond a second predetermined level, the governor is closed to cause the compressor to compress input air. It is a common practice to preset a differential between the first and second predetermined pressure levels in order to prevent the governor from chattering.

However, the controlled operation of the compressor occurs without any relation with the running conditions of the engine, though being related with the pressure in the accumulator only. Accordingly, the compressor tends to be driven to an excessive extent while the engine runs at a heavy load, thereby affecting the operation of the vehicle.

SUMMARY OF THE INVENTION

A pressure control system embodying the present invention is applicable to a pneumatic pressure supply line installed in a vehicle which includes a compressor driven by an engine of the vehicle and accumulator communicated with the compressor through a pressure supply conduit. An unloading pressure control valve is adapted to selectively urge a spring-loaded in the valve to an open position. A pressure feedback conduit communicates the accumulator to the unloading pressure control valve. Disposed in the pressure feedback conduit is a solenoid operated valve which blocks and unblocks the communication of the accumulator to the unloading pressure control valve. An engine load is sensed by a load sensor and a pressure in the accumulator by a pressure sensor. The solenoid operated valve is controlled by a control unit in response to output signals of the load sensor and pressure sensor. For a heavy load engine operation, the valve is controlled in a first mode wherein it is opened at a first predetermined level of pressure in the accumulator during an elevation of the pressure while being closed at a second predetermined level of pressure which is lower than the first predetermined level by a substantial amount during a drop of the pressure. For a light load engine operation, the valve is actuated in a second mode in which the second predetermined level is at least closer to the first predetermined level than in the first mode.

In accordance with the present invention, a unique system is disclosed which controls a pressure in a pneumatic pressure supply line of a vehicle in response to both a pressure developing in an accumulator included in the supply line and an engine load, so that a compressor for providing the pressure is activated under light load engine operation, as when air brakes are applied, to effect an engine brake for assisting the air brakes and to elevate the accumulator pressure for reducing the total energy consumption and, therefore, fuel consumption as a whole. A pressure feedback conduit communicates a pressure in the accumulator to an unloading pressure control valve through a solenoid operated valve, which is controlled in response to an output of an engine load sensor and that of a pressure sensor. Under heavy load engine operation, the solenoid operated valve is opened at a first pressure level during an elevation of the pressure and closed at a second pressure level which is sufficiently lower than the first during a drop of the pressure. Under light load engine operation, the second pressure level is preselected to be identical with or substantially identical with the first.

It is an object of the present invention to desirably match the control of a compressor not only to a pressure in an accumulator but to a varying engine load, thereby effecting an engine brake to assist air brakes and raising the accumulator pressure to improve the total fuel economy each in a light load operation of an engine.

It is another object of the present invention to provide a generally improved pressure control system for an air piping of a vehicle.

Other objects, together with the foregoing, are attained in the embodiment described in the following description and illustrated in the accompanying drawings.

BRIEF DESCRIPTION OF THE DRAWINGS

FIGS. 2a and 2b indicate different operation modes of a control unit for a heavy load engine operation and a light load engine operation, respectively.

DESCRIPTION OF THE PREFERRED EMBODIMENT

Figure 1:
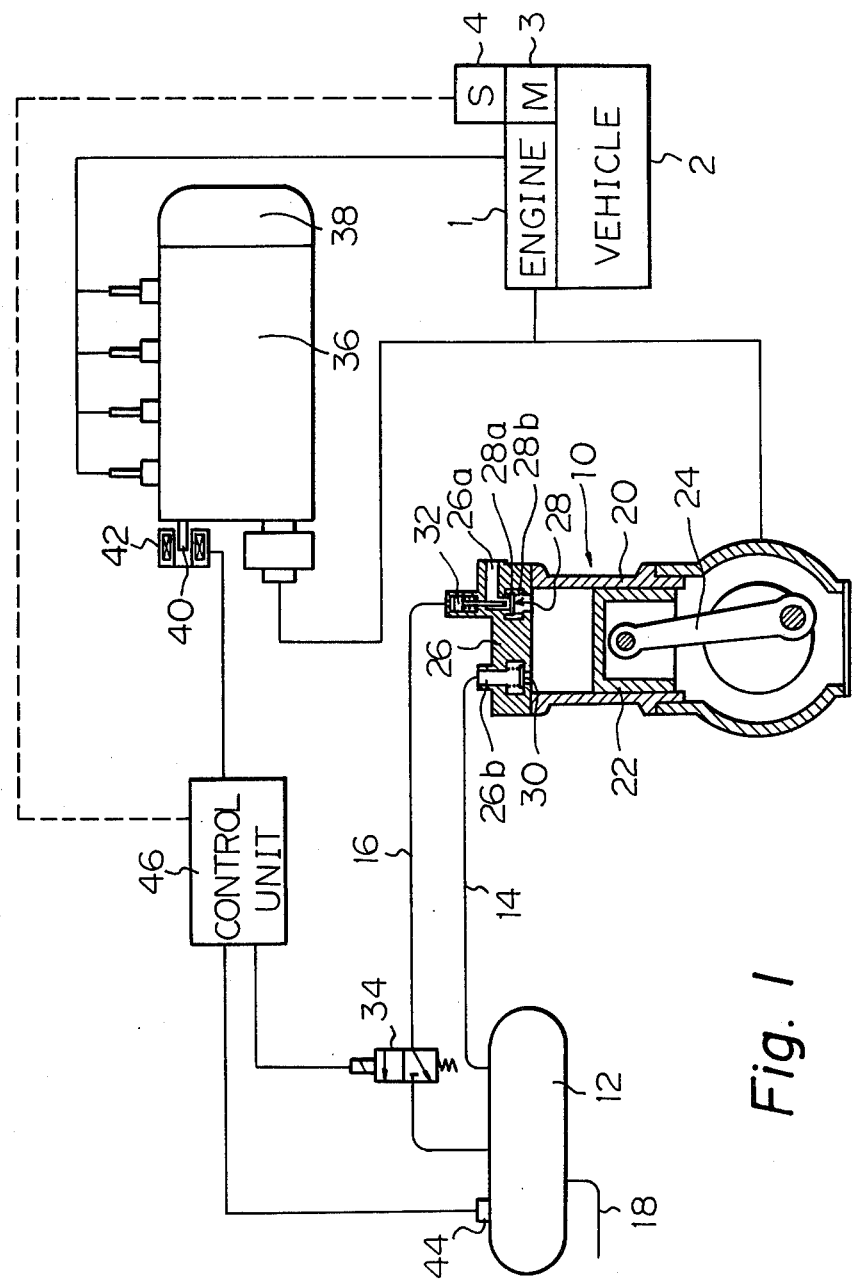
FIG. 1 illustrates a pressure control system for an automotive air piping embodying the present invention.

While the pressure control system for an automotive pneumatic pressure supply line of the present invention is susceptible of numerous physical embodiments, depending upon the environment and requirements of use, substantial numbers of the herein shown and described embodiments have been made, tested and used, and all have performed in an eminently satisfactory manner.

Referring to FIG. 1 of the drawings, a pneumatic pressure supply line to which the present invention is applicable includes a compressor 10 and an accumulator 12 which are intercommunicated by a pressure supply conduit 14 and a pressure feedback conduit 16. Air fed under pressure from the compressor 10 via the conduit 14 is stored in the accumulator 12 to be supplied through a pressure delivery conduit 18 to pneumatically operated various loads exemplified by usual brake units, suspension units and an automatic door (not shown).

The compressor 10 has a cylinder 20 in which a piston 22 is reciprocatable in accordance with the movement of a connecting rod 24. The compressor 10 is operatively connected with an engine 1 of a vehicle 2 through a timing gear so that it is rotatable continuously while the engine is driven. A cylinder head 26 is rigidly mounted on the upper end of the cylinder 20. The cylinder head 26 is formed with a suction port 26a, and a delivery port 26b from which the pressure supply conduit 14 extends to the accumulator 12. The suction port 26a is blocked and unblocked by a spring-loaded intake valve 28 comprising a valve element 28a and a compression spring 28b, and the delivery port 26b by a spring-loaded delivery valve 30. An unloading pressure control valve 32 is arranged on top of the cylinder head 26 just above the intake valve 28. The unloading valve 32 is communicated with the accumulator 12 by the pressure feedback conduit 16 and constructed to control the intake valve 28 acted upon by the pressure in the conduit 16. When the pressure rises beyond a predetermined value, the unloading valve 32 forcibly opens the valve 28 to cause the compressor 10 into its relief or decompression state thereby adjusting the delivery pressure to the accumulator 12.

Communication of the pressure from the accumulator 12 to the unloading valve 32 is controlled by a solenoid operated valve 34 which is disposed in the pressure feedback conduit 16.

A fuel pump 36 supplies the engine 1 with fuel and has a governor 38 at one side thereof. The volume of fuel supply to the engine 1 is controlled in accordance with an engine load by a control rack 40 which is movable rightwardly or leftwardly as viewed in FIG. 1 in interlocked relation with an accelerator pedal (not shown), while being adjusted in position by the governor 38.

A load sensor 42 is fixed in position around that portion of the control rack 40 which protrudes from the pump 36. The load sensor 42 is adapted to sense a load of the engine 1 in terms of a position of the control rack 40, producing an electric signal which thus represents a sensed load. A typical example of such a sensor 42 may be a differential transformer. If desired, the load sensor 42 may be designed to sense an engine load in terms of a position of the accelerator pedal. A pressure sensor 44 is mounted on the accumulator 12 to deliver an electric signal which indicates a pressure developing in the accumulator 12.

A control unit 46 receives output signals of the load sensor 42 and pressure sensor 44 to in turn supply its control output to the solenoid operated valve 34, thereby controlling the valve 34 to match it with the sensed engine load and accumulator pressure. The control unit 46 is operable in two selective control modes which are determined by suitable conventional means comprising, for example, a Schmitt Trigger, as shown in FIGS. 2a and 2b by way of example. During a heavy load operation of the engine 1 the control mode shown in FIG. 2a is set up in which the valve 34 is opened upon elevation of the accumulator pressure beyond a value $P_2$ and is closed upon drop of the accumulator pressure beyond a value $P_1$. As shown, the valve opening pressure and valve closing pressure in a heavy load condition have a substantial differential therebetween. During a light load operation, on the other hand, the control mode shown in FIG. 2b is set up in which the valve closing pressure while the accumulator pressure is lowering is approximate to or equal to the valve opening pressure $P_2$; the differential, if any, is far smaller than in the case of heavy load operation.

In operation, while the engine 1 is driven under heavy load, the pressure in the accumulator 12 is progressively increased. At the instant the accumulator pressure reaches the level $P_2$, the valve 34 is opened to unblock the communication of the pressure from the accumulator 12 to the unloading valve 32 via the pressure feedback conduit 16. Then, the unloading valve 32 forces the intake valve 28 to open so that the compressor 10 is brought into the decompression state. The pneumatic pressure in the accumulator 12 will thereafter be consumed by one load or another. However, the decompression state continues until the accumulator pressure drops down to the level $P_1$ because, as will be recalled, the valve 24 is controlled by the control unit 46 in the mode shown in FIG. 2a.

As the output signal of the load sensor 42 indicates a light load, the control mode of the control unit 46 is switched from one shown in FIG. 2a to one shown in FIG. 2b so that, when the accumulator pressure is at or lower than $P_2$, the valve 34 is closed immediately to discommunicate the unloading valve 32 from the accumulator 12. Then, the unloading valve 32 is moved back to a position where the intake valve 28 regains its closed position. This sets up the compression state of the compressor 10 instead of the decompression state. In the case of downhill drive of the vehicle 2, for example, the operation of the compressor 10 will result in an increase in the engine load which effects an engine brake. In this manner, the delivery of compressed air to the accumulator 12 occurs while the supply of fuel to the engine 1 is minimum in the idling condition or practically zero, reducing the total fuel consumption by a corresponding amount.

The embodiment shown and described has been applied to a Diesel engine. However, it is also applicable to a gasoline-powered engine only if a load sensor 4 responsive to an engine load is constructed and arranged to sense a vacuum of an intake manifold 3 of the engine, as shown in broken line.

In summary, it will be seen that the present invention provides a pressure control system for an automotive pneumatic pressure supply line which activates a compressor during a light load engine operation, such as when air brakes are applied, thereby enhancing the braking effort of the vehicle while increasing a pressure in an accumulator to cut down overall fuel consumption of the engine.

Various modifications will become possible for those skilled in the art after receiving the teachings of the present disclosure without departing from the scope thereof.

What is claimed is:

1. A pressure control system for a pneumatic pressure supply line installed in a vehicle, the supply line including a compressor driven by an engine of the vehicle and an accumulator communicated with the compressor through a pressure supply conduit, characterized by comprising:

an unloading pressure control valve selectively urging a spring-loaded intake valve of the compressor to an open position;

a pressure feedback conduit communicating the accumulator to the unloading pressure control valve;

a solenoid operated valve disposed in the pressure feedback conduit to block and unblock the communication of the accumulator to the unloading pressure control valve;

a load sensor responsive to a load acting on the engine;

a pressure sensor responsive to an accumulator pressure; and a control unit controlling the solenoid operated valve in response to an output signal of the load sensor and that of the pressure sensor, the control occurring, for a heavy load engine operation, in a first mode wherein the solenoid operated valve opens at a first predetermined level of accumulator pressure during an elevation of the accumulator pressure while closing at a second predetermined level of accumulator pressure which is lower than the first predetermined level by a substantial amount during a drop of the pressure, and, for a light load engine operation, in a second mode wherein the second predtermined level is at least closer to the first predetermined level than in the first mode.

2. A system as claimed in claim 1, in which the second predetermined level substantially coincides with the first predetermined level in the second mode.

3. A system as claimed in claim 1, in which the engine comprises a Diesel engine, the engine load sensor sensing a position of a control rack of a fuel supply pump associated with the engine.

4. A system as claimed in claim 1, in which the engine comprises a gasoline-powered engine, the engine load sensor sensing an intake manifold vacuum of the engine.

* * * * *